US006745124B2

(12) United States Patent
Aloi et al.

(10) Patent No.: US 6,745,124 B2
(45) Date of Patent: Jun. 1, 2004

(54) METHOD AND SYSTEM FOR DETERMINING A NAVIGATING VEHICLE LOCATION

(75) Inventors: Daniel N. Aloi, Rochester Hills, MI (US); Steven P. Schwinke, Plymouth, MI (US); Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 131 days.

(21) Appl. No.: 10/002,507

(22) Filed: Nov. 30, 2001

(65) Prior Publication Data

US 2003/0105583 A1 Jun. 5, 2003

(51) Int. Cl.[7] .......................... H04B 7/185; G01S 5/02; H04Q 7/20
(52) U.S. Cl. ................... 701/207; 701/213; 342/353
(58) Field of Search ................... 701/207, 213, 701/211; 342/357.09, 357.17, 353, 357.01, 453, 462

(56) References Cited

U.S. PATENT DOCUMENTS

| 5,126,748 | A | * | 6/1992 | Ames et al. ............... 342/353 |
| 6,034,626 | A | | 3/2000 | Maekawa et al. ...... 340/995.21 |
| 6,266,612 | B1 | * | 7/2001 | Dussell et al. ............... 701/207 |
| 6,278,942 | B1 | | 8/2001 | McDonough ............... 701/210 |
| 6,487,496 | B2 | | 11/2002 | Katayama et al. .......... 701/209 |
| 6,552,682 | B1 | * | 4/2003 | Fan ....................... 342/357.09 |
| 6,580,909 | B1 | * | 6/2003 | Carro .......................... 455/435 |

* cited by examiner

Primary Examiner—Tan Q. Nguyen
Assistant Examiner—Dalena Tran
(74) Attorney, Agent, or Firm—Anthony Luke Simon

(57) ABSTRACT

The present invention provides a system, a method and a computer usable medium including a program for determining a position of a mobile vehicle. This may be accomplished by receiving a positioning request from the mobile vehicle, receiving positioning information from at least three vehicle clients sharing an antenna tower with the mobile vehicle and transmitting a signal to the three vehicles. It may also be accomplished by determining a distance between the mobile vehicle and each of the vehicle clients, receiving positioning information from each of the vehicle clients and determining mobile vehicle position based on the determined distances and the vehicle client positioning information.

18 Claims, 4 Drawing Sheets

METHOD AND SYSTEM FOR DETERMINING A NAVIGATING VEHICLE LOCATION

FIELD OF THE INVENTION

This invention relates generally to the navigation of a moving vehicle. In particular, this invention relates to a method and system for determining a position of a mobile vehicle.

BACKGROUND OF THE INVENTION

Global Position System technology has become very reliable and relied upon in recent years. Many automobile makers are incorporating this technology into their baseline designs.

Millions of systems have been deployed that have the ability to autonomously calculate the positions where the system is currently located using information received via a GAPS satellite.

However, there may be instances where the vehicle position cannot be calculated. One such instance may occur when a vehicle has navigated into an area where a GAPS signal is blocked due to an obstruction, for example a tall building.

It would be desirable therefore to provide a method for determining a position of a mobile vehicle that overcomes the above limitations of GAPS technology.

SUMMARY OF THE INVENTION

One aspect of the present invention provides a method for determining a position of a mobile vehicle. A positioning request may be received from the mobile vehicle. Positioning information from at least three vehicle clients sharing an antenna tower with the mobile vehicle may also be received and a signal may be transmitted to the three vehicles. A distance between the mobile vehicle and each of the vehicle clients may be determined.

Positioning information may be received from each of the vehicle clients and mobile vehicle position may be determined based on the determined distances and the positioning information.

Another aspect of the present invention provides a system for determining a position of a mobile vehicle.

The system may include means for receiving a positioning request from the mobile vehicle, means for receiving positioning information from at least three vehicle clients sharing an antenna tower with the mobile vehicle and means for transmitting a signal to the three vehicles. It may also include means for determining a distance between the mobile vehicle and each of the vehicle clients, means for receiving positioning information from each of the vehicle clients and means for determining mobile vehicle position based on the determined distances and the positioning information.

Another aspect of the present invention provides a computer usable medium including a program for determining a position of a mobile vehicle.

The program may include computer program code that receives a positioning request from the mobile vehicle, receives positioning information from at least three vehicle clients sharing an antenna tower with the mobile vehicle and transmits a signal to the three vehicles. It may also include computer program code that determines a distance between the mobile vehicle and each of the vehicle clients, receives positioning information from each of the vehicle clients and determines mobile vehicle position based on the determined distances and the positioning information.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
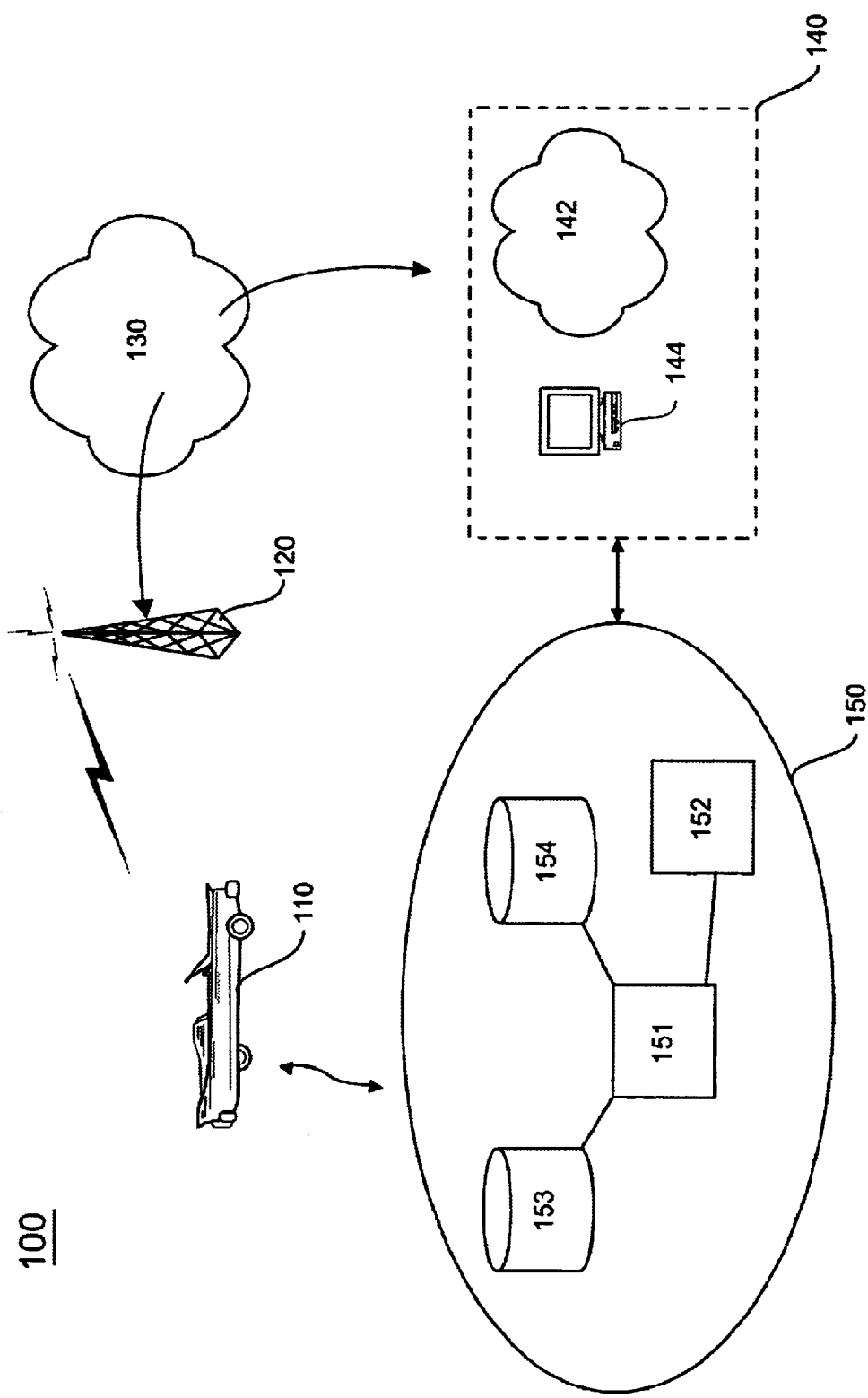
FIG. 1 is a schematic diagram of a system for determining a position of a mobile vehicle in accordance with the present invention.

FIG. 1 shows one embodiment of a system for determining a position of a mobile vehicle in accordance with the present invention at 100. The system may include one or more vehicle clients. 110, one or more carrier systems 120, one or more communication networks 130, one or more service management subsystems 140, and one or more navigation subsystems 150. The service management subsystems may comprise one or more service management applications 142 and one or more service managers 144. The navigation subsystems 150 may comprise one or more route applications 151, 152 and one or more coordinate databases 153, 154.

Navigation subsystem 150 is a system for generating routes to be delivered to vehicle client 110 and for receiving route information from vehicle client 110. Navigation subsystem 150 may be connected with or in communication with service management subsystem 140. Service management subsystem 140 may be used to manage the delivery of information to or from navigation subsystem 150 to other parts of system 100. Routes may be delivered or information may be received via a live agent, such as a human advisor, or via a virtual agent, such as an interactive computer program.

Navigation subsystem 150 may be any suitable hardware or software configuration, or combination of hardware and software that is configured to generate a route, process route information or receive information from vehicle client 110. In one embodiment of the invention, navigation subsystem 150 comprises one or more route applications 151, 152 and one or more coordinate databases 153, 154. For example, route applications 151, 152 may be any suitable software application for generating route information or otherwise processing route information. Coordinate databases 153, 154 may be any suitable databases for storing route information, such as location coordinates.

Vehicle client 110 may be any suitable vehicle. For example, the vehicle may be an automobile or a passengercarrying unit such as a bus or train. Alternatively, vehicle client 110 may be an occupant of the vehicle or any suitable client device contained in the vehicle. In one embodiment of the invention, vehicle client 110 is a mobile or portable device equipped to communicate with service management subsystem 140. Carrier system 120 is any suitable system for transmitting a signal from vehicle 110 to service management subsystem 140. Carrier system 120 may also transmit a signal from service management subsystem 140 to vehicle client 110. In one embodiment of the invention, carrier system 120 is a wireless carrier system as is well known in the art. Carrier system 120 may be, for example, a transmitter/receiver unit attached to vehicle client 110. Alternatively, carrier system 120 may be a separate transmitter/receiver carried by vehicle client 110.

Communication network 130 is any suitable system for communicating between vehicle client 110 and service management subsystem 140. In one embodiment of the invention, communication network is a public switched telephone network (PSTN). Alternatively, communication network 130 may be a multi protocol Internet or Intranet capable of transmitting voice and/or data in either analog or digital form or a combination of both. Alternatively, communication network 130 may be a hybrid communication network or virtual network.

Service management subsystem 140 is a system for managing a variety of services to be delivered to or from vehicle client 110. In one embodiment of the invention, service management subsystem 140 manages services that can be distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Figure 2:
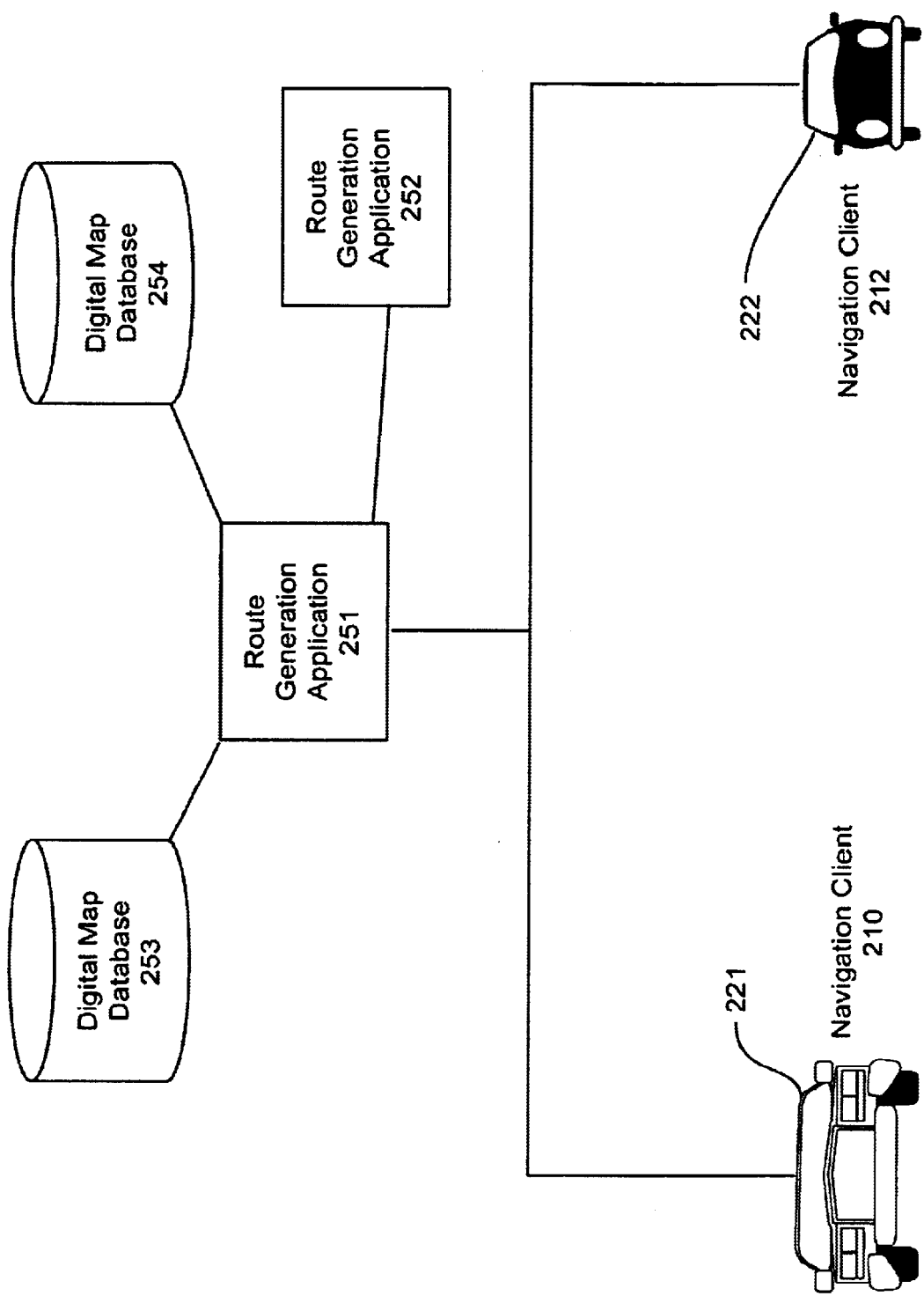
FIG. 2 is a schematic diagram of another embodiment of a system for determining a position of a mobile vehicle in accordance with the present invention.

FIG. 2 shows one embodiment of determining a position of a mobile vehicle in accordance with the present invention at 200. Navigation system 200 may include one or more navigation clients 210, 212. Each navigation client 210, 212 may have an in-vehicle navigator 221, 222. Navigation system 200 may also include one or more route generation applications 251, 252. Navigation system 200 may also include one or more coordinate databases 253, 254.

Navigation clients 210, 212 may be one or more vehicle clients as described above.

In-vehicle navigator 221, 222 may be any suitable component of navigation client 210, 212, which may be used to navigate vehicle client 210, 212. For example, in-vehicle navigator 221, 222 may be a driver. Alternatively, in-vehicle navigator 221, 222 may be an automatic system for navigating vehicle 210, 212.

Route generation applications 251, 252 may be any suitable application for calculating maneuver lists of directions between one or more locations. For example, route generation applications 251, 252 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 251, 252 are in communication with coordinate databases 253, 254.

Route generation applications 251, 252 may generate navigation information in any suitable manner. For example, route generation applications 251, 252 may generate routes using geocoding. That is, the application 251, 252 determines a corresponding latitude and longitude based on an input navigation address. Alternatively, route generation applications 251, 252 may generate routes using reverse geocoding. That is, the application 251, 252 determines a corresponding navigation address based on input latitude and longitude coordinates.

Coordinate databases 253, 254 may be any suitable databases for storing such location coordinates as latitude and longitude of a variety of locations. These locations may be, for example, points of interest. Coordinate databases 253, 254 may also be a database of street addresses. Coordinate databases 253, 254 may also be a database of routes between points.

Figure 3:
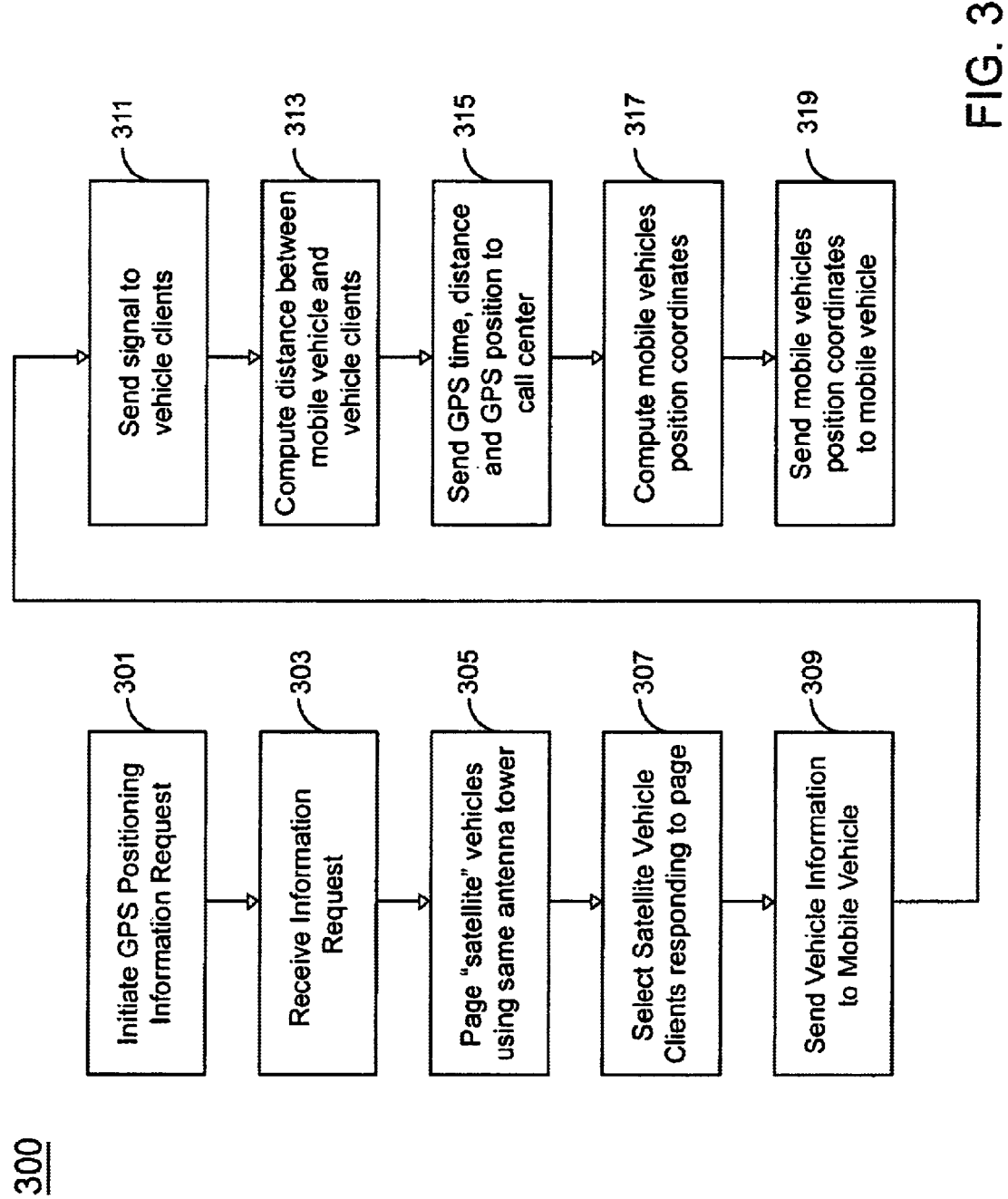
FIG. 3 shows a flow diagram of one embodiment of a method for determining a position of a mobile vehicle in accordance with the present invention.
Figure 4:
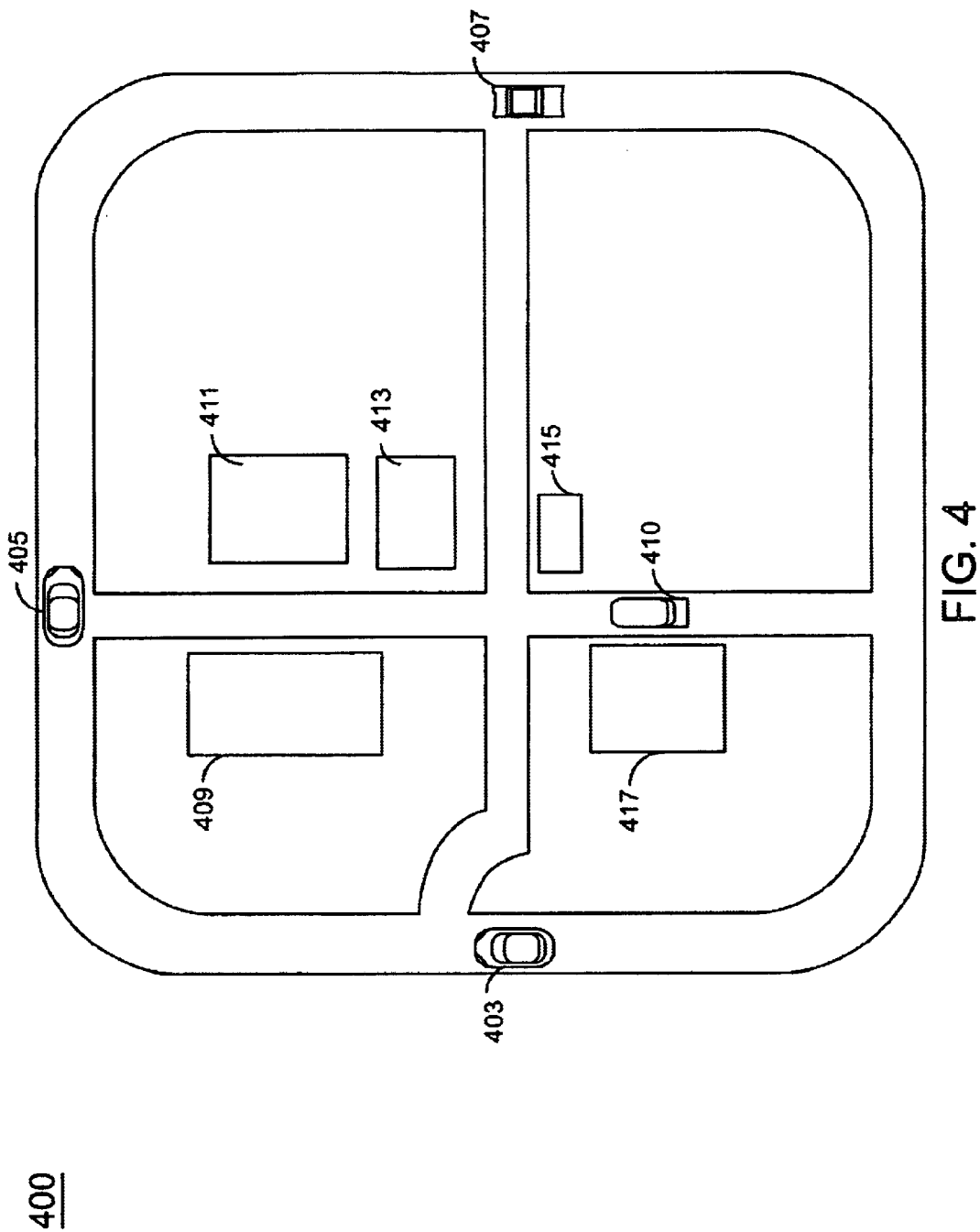
FIG. 4 is a sequence diagram, illustrating one embodiment of a method for determining a position of a mobile vehicle in accordance with the present invention.

Referring now to FIGS. 1, 3 and 4. FIG. 3 shows a flow diagram of one embodiment of a method for determining a position of a mobile vehicle in accordance with the present invention at 300. FIG. 4 is a sequence diagram, illustrating one embodiment of a method for determining a position of a mobile vehicle in accordance with the present invention at 400.

The mobile vehicle 410 may initiate a request to the call center to determine its GAPS positioning (block 301). The request may be initiated by via pushing a button, selecting an option from an onboard keypad or other methods well known in the art. The request may be transmitted via an antenna tower 120 over a cellular network 130. The request may be received at the call center navigation system server 150 along with a time stamp of the requested information (block 303). The call center may then "page" vehicles on the communication network 130 that share the same tower antenna 120 (block 305). The navigation system server 150 may select at least three vehicles 403, 405, 407 responding to the page that may share the tower antenna 120 with mobile vehicle 410 (block 307). After being selected, vehicles 403, 405, 407 may send positioning information, which may include, GAPS coordinates, a vehicle identifier and GAPS time to the mobile vehicle 410 (block 309). The mobile vehicle may time stamp the received signal and may acknowledge receipt of vehicle clients 403, 405, 407 positioning information by transmitting a signal via the antenna tower 120 over the cellular network 130 to each of the vehicle clients 403, 405, 407 (block 311). Each of the vehicles 403, 405,407 may receive the signal from the mobile vehicle and may determine the distance between the mobile vehicle 410 and each vehicle client 403, 405, and 407 according to the formula:

$$R = c*(TOR-TOT)$$

Where, R may represent the distance between the mobile vehicle 410 and each of the vehicle clients 403, 405, 407, c may represent the speed of light constant, TOR may represent the time of receipt of positioning information by the mobile vehicle and TOT may represent the time of transmission of positioning information to the mobile vehicle 410 by vehicle clients 403, 405 and 407 (block 313). Vehicle clients 403, 405 and 407 may send each vehicle's positioning information, determined distances and GAPS time to the navigation system server 150 at the call center (block 315) and the navigation system server 150 may receive this information and may compute position coordinates for mobile vehicle 410 (block 317). The navigation system server 150 may then send the GAPS coordinates to mobile vehicle 410 per the initial request (block 319).

Referring now to FIG. 4, 409, 411, 413, 415 and 417 may represent buildings which may block a signal between the mobile vehicle 410 and a GAPS satellite. Vehicle 410 is navigating and may not be able to establish its exact position, for example a large tree may be obstructing it line of sight with a GAPS satellite thereby blocking transmission from the satellite. Another example is an instance where the mobile vehicle 410 may not have GAPS capability. Mobile vehicle 410 may initiate a "request for position determination" signal to the navigation system server 150 at a call center via the cellular network and a tower antenna 120. This request may trigger the navigation system server 150 located at the call center to send out a page to all vehicles which communicate with the same antenna tower 120 as vehicle 410. A second vehicle 403, a third vehicle 405 and fourth vehicle 407 respond to the page and are selected. The vehicle clients 403, 405, 407 may send position information, which may include a GAPS time stamp, a vehicle client identifier and GAPS coordinates to mobile vehicle 410. After receipt of the vehicles 403, 405, 407 position information, mobile vehicle 410 may send a signal to vehicles 403, 405, 407 which may include receipt of position information acknowledgement and a time of transmission time stamp. Vehicles 403, 405 and 407 may each receive the transmitted signal from mobile vehicle 410 and may time stamp the "time of receipt." Vehicles 403, 405, 407 may each determine the distance to the mobile vehicle 410 according to the formula:

$$R = c^*(TOR - TOT)$$

Where R may represent the distance between each vehicle client and the mobile vehicle 410, c may represent the speed of light constant, TOR may represent the that time mobile vehicle 410 signal was received at each vehicle client 403, 405, 407.

Each vehicle client 403, 405, 407 may transmit GAPS coordinates and distance between each vehicle client 403, 405, 407 and mobile vehicle 410 to the navigation system server 150 located at the call center.

The navigation system server 150 may compute the position coordinates for mobile vehicle 410 according to the formulas:

$$R_{car2} = c^*(TOR_{car1} - TOT^{car2}) = \overline{(X_{car1} - X_{car2})^2 + (Y_{car1} - Y_{car2})^2}$$

$$R_{car3} = c^*(TOR_{car1} - TOT^{car3}) = \overline{(X_{car1} - X_{car3})^2 + (Y_{car1} - Y_{car3})^2}$$

$$R_{car4} = c^*(TOR_{car1} - TOT^{car4}) = \overline{(X_{car1} - X_{car4})^2 + (Y_{car1} - Y_{car4})^2}$$

Where $R_{car2}$, $R_{car3}$, and $R_{car4}$ may represent the distance between the mobile vehicle 410 and client vehicle 403, 405 and 407, respectively. "X" and "Y" may represent the coordinates of the vehicle.

By using a Taylor series expansion and a least squares iterative approach, the coordinates, for the mobile vehicle 410, $X_{car1}$, $Y_{car1}$, may computed according to the above formulas. These coordinates may be transmitted from the call center navigation system server 150 to the mobile vehicle 410.

While the embodiments of the invention disclosed herein are presently considered preferred, various changes and modifications can be made without departing from the spirit and scope of the invention. The scope of the invention is indicated in the appended claims, and all changes that come within the meaning and range of equivalents are intended to be embraced therein.

We claim:

1. A method for determining a position of a mobile vehicle comprising:

receiving a positioning request from the mobile vehicle;

receiving positioning information from at least three vehicle clients sharing an antenna tower with the mobile vehicle;

transmitting a signal to the at least three vehicles;

determining a distance between the mobile vehicle and each of the at least three vehicle clients;

receiving positioning information from each of the at least three vehicle clients; and determining mobile vehicle position based on the determined distances and the positioning information.

2. The method of claim 1, wherein receiving a positioning request comprises the mobile vehicle transmitting a RF signal through an antenna tower to the call center.

3. The method of claim 1, wherein receiving position information comprises selecting at least three vehicles that respond to a paging of all vehicles that are in communication with the antenna tower.

4. The method of claim 1, wherein transmitting a signal comprises sending the at least three vehicle clients the mobile vehicles GAPS time to each of the at least three vehicle clients.

5. The method of claim 1, wherein the distance is computed at each vehicle client according to the formula:

$$R = c(TOR - TOT)$$

where R represents the distance between the mobile vehicle and each vehicle client, c represents a speed of light constant, TOR represents the mobile vehicle signal receipt time stamp at each vehicle client and TOT represents the time of transmission of mobile vehicle signal received at each vehicle client.

6. The method of claim 5, wherein the position coordinates are determined by using a Taylor expansion series technique and a least squares iterative method.

7. The method of claim 1, wherein the positioning information includes GPS time, client vehicle two-dimension coordinates and the determined distance.

8. The method of claim 1, wherein the mobile vehicle position is determined at the call center according to the formulas:

$$R_{car2} = c^*(TOR_{car1} - TOT^{car2}) = \overline{(X_{car1} - X_{car2})^2 + (Y_{car1} - Y_{car2})^2}$$

$$R_{car3} = c^*(TOR_{car1} - TOT^{car3}) = \overline{(X_{car1} - X_{car3})^2 + (Y_{car1} - Y_{car3})^2}$$

$$R_{car4} = c^*(TOR_{car1} - TOT^{car4}) = \overline{(X_{car1} - X_{car4})^2 + (Y_{car1} - Y_{car4})^2}$$

where $R_{car2}$, $R_{car3}$ and $R_{car4}$ represents the distance value between the mobile vehicle and each of the vehicle clients, C represents the speed of light constant, TOR represents the mobile vehicle signal receipt time stamp at each vehicle client, TOT represents the time of transmission of mobile vehicle signal received at each vehicle client and "X" and "Y" represent position coordinates of each of the three vehicle clients.

9. A computer usable medium including a program for determining a position of a mobile vehicle comprising:

computer readable program code that receives a positioning request from the mobile vehicle;

computer readable program code that receives positioning information from at least three vehicle clients sharing an antenna tower with the mobile vehicle;

computer readable program code that transmits a signal to the at least three vehicles;

computer readable program code that determines a distance between the mobile vehicle and each of the at least three vehicle clients;

computer readable program code that receives positioning information from each of the at least three vehicle clients; and computer readable program code that determines mobile vehicle position based on the determined distances and the positioning information.

10. The computer usable medium of claim 9, wherein receiving a positioning request comprises the mobile vehicle transmitting a RF signal through an antenna tower to the call center.

11. The computer usable medium of claim 9, further comprising:

computer readable program code that selects at least three vehicles that respond to a paging of all vehicles that are in communication with the antenna tower.

12. The computer usable medium of claim 9, wherein transmitting a signal comprises sending the at least three vehicle clients the mobile vehicles GAPS time to each of the at least three vehicle clients.

13. The system of claim 12, further comprising:

means for selecting at least three vehicles that respond to a paging of all vehicles that are in communication with the antenna tower.

14. The computer usable medium of claim 9, wherein distance is computed at each vehicle client according to the formula:

$$R = c(TOR - TOT)$$

where R represents the distance between the mobile vehicle and each vehicle client, c represents a speed of light constant, TOR represents the mobile vehicle signal receipt timestamp at each vehicle client and TOT represents the time of transmission of mobile vehicle signal received at each vehicle client.

15. The computer usable medium of claim 14, wherein the position coordinates are determined by using a Taylor expansion series technique and a least squares iterative method.

16. The computer usable medium of claim 9, wherein the positioning information includes GPS time, client vehicle two-dimension coordinates and the determined distance.

17. The computer usable medium of claim 9, wherein the mobile vehicle position is determined at the call center according to the formulas:

$$R_{car2} = c*(TOR_{car1} - TOT^{car2}) = \overline{(X_{car1}-X_{car2})^2 + (Y_{car1}-Y_{car2})^2}$$

$$R_{car3} = c*(TOR_{car1} - TOT^{car3}) = \overline{(X_{car1}-X_{car3})^2 + (Y_{car1}-Y_{car3})^2}$$

$$R_{car4} = c*(TOR_{car1} - TOT^{car4}) = \overline{(X_{car1}-X_{car4})^2 + (Y_{car1}-Y_{car4})^2}$$

where $R_{car2}$, $R_{car3}$ and $R_{car4}$ represents the distance value between the mobile vehicle and each of the vehicle clients, C represents the speed of light constant, TOR represents the mobile vehicle signal receipt timestamp at each vehicle client, TOT represents the time of transmission of mobile vehicle signal received at each vehicle client and "X" and "Y" represent position coordinates of each of the three vehicle clients.

18. A system for determining a position of a mobile vehicle comprising:

means for receiving a positioning request from the mobile vehicle;

means for receiving positioning information from at least three vehicle clients sharing an antenna tower with the mobile vehicle;

means for transmitting a signal to the at least three vehicles;

means for determining a distance between the mobile vehicle and each of the at least three vehicle clients;

means for receiving positioning information from each of the at least three vehicle clients; and means for determining mobile vehicle position based on the determined distances and the positioning information.

* * * * *